United States Patent
Roos et al.

(10) Patent No.: US 7,488,021 B1
(45) Date of Patent: Feb. 10, 2009

(54) CONFIGURABLE PIVOTING CAGE CARGO RETAINER

(75) Inventors: Nelson Roos, Charlottesville, VA (US); Scott Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 474 days.

(21) Appl. No.: 11/454,531

(22) Filed: Jun. 16, 2006

Related U.S. Application Data

(63) Continuation-in-part of application No. 10/969,417, filed on Oct. 20, 2004, now Pat. No. 7,347,473.

(60) Provisional application No. 60/515,066, filed on Oct. 28, 2003.

(51) Int. Cl.
*B62D 33/03* (2006.01)

(52) U.S. Cl. ............... 296/26.11; 296/51; 296/57.1; 296/62; 296/37.6

(58) Field of Classification Search ............ 296/26.08, 296/26.1, 26.11, 51, 57.1, 62, 183.1, 37.6; 224/402–404
See application file for complete search history.

(56) References Cited

U.S. PATENT DOCUMENTS

| | | | | |
|---|---|---|---|---|
| 5,303,969 | A * | 4/1994 | Simnacher | 296/37.6 |
| 5,398,987 | A * | 3/1995 | Sturgis | 296/37.6 |
| 5,700,047 | A | 12/1997 | Leitner | 296/26 |
| D417,859 | S | 12/1999 | Leitner | D12/414 |
| D418,106 | S | 12/1999 | Leitner | D12/414 |
| 6,019,410 | A * | 2/2000 | Trostle et al. | 296/26.11 |
| 6,113,173 | A | 9/2000 | Leitner | 296/26.11 |
| 6,402,215 | B1 | 6/2002 | Leitner | 296/26.11 |
| 6,481,604 | B1 * | 11/2002 | Beene et al. | 224/404 |
| 6,540,123 | B1 | 4/2003 | Kmita | 224/403 |
| 6,626,478 | B1 * | 9/2003 | Minton | 296/26.11 |
| 6,676,182 | B2 * | 1/2004 | Fitts | 296/26.11 |
| 6,805,392 | B2 | 10/2004 | Leitner | 296/26.08 |
| 7,111,886 | B1 * | 9/2006 | Miller et al. | 296/26.11 |
| 7,347,473 | B2 * | 3/2008 | Miller et al. | 296/26.1 |
| 2002/0096901 | A1 * | 7/2002 | Iafrate et al. | 296/26.11 |
| 2005/0012354 | A1 | 1/2005 | Leitner | 296/26.08 |
| 2005/0093324 | A1 * | 5/2005 | Bruford et al. | 296/57.1 |
| 2005/0093326 | A1 * | 5/2005 | Miller et al. | 296/57.1 |
| 2007/0170739 | A1 * | 7/2007 | Sims | 296/26.11 |
| 2008/0217944 | A1 * | 9/2008 | Wood et al. | 296/26.11 |

* cited by examiner

*Primary Examiner*—Jason S Morrow
(74) *Attorney, Agent, or Firm*—Gregory Brown; Miller Law Group, PLLC

(57) ABSTRACT

A pivoting cage cargo is formed of opposing gate assemblies mounted on the rearwardmost D-pillar of a pick-up truck and movable from a folded, collapsed storage position against the respective side walls of the cargo box into multiple selectable operative configurations. The pivoting cage cargo retainer can be positioned in two different transversely extending positions that span the cargo bed when the gate assemblies are connected together. In one transverse position, the coupled gate assemblies cooperate with a lowered tailgate to provide a bed extension function. The other transverse position spans across the cargo bed to provide a divider function. Each gate assembly is also positionable into a storage container configuration that defines a small cargo retention area adjacent the side wall for the retention of small objects, such as grocery bags. A latching mechanism retains the gate assembly next to the side wall.

20 Claims, 12 Drawing Sheets

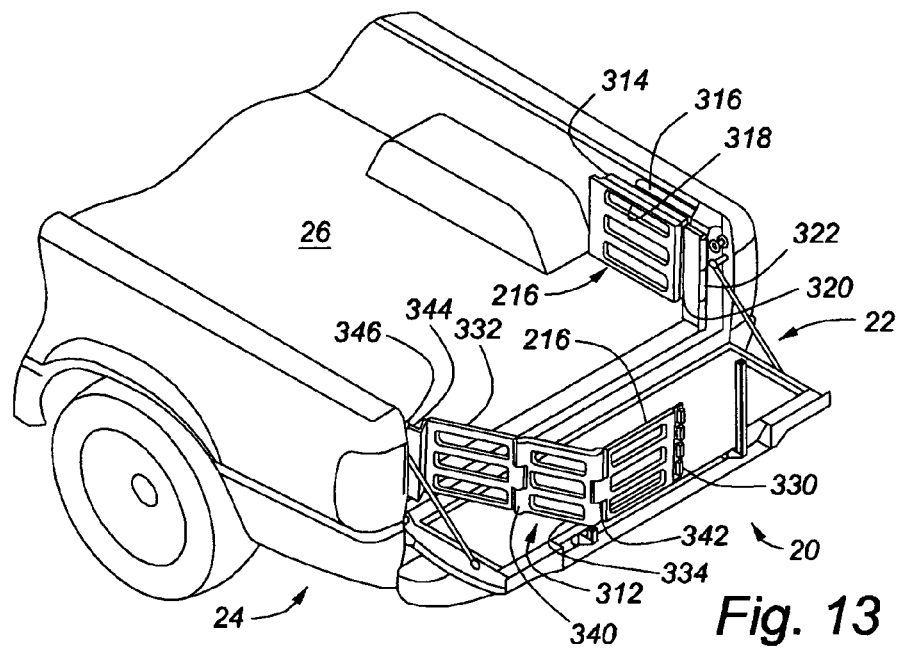
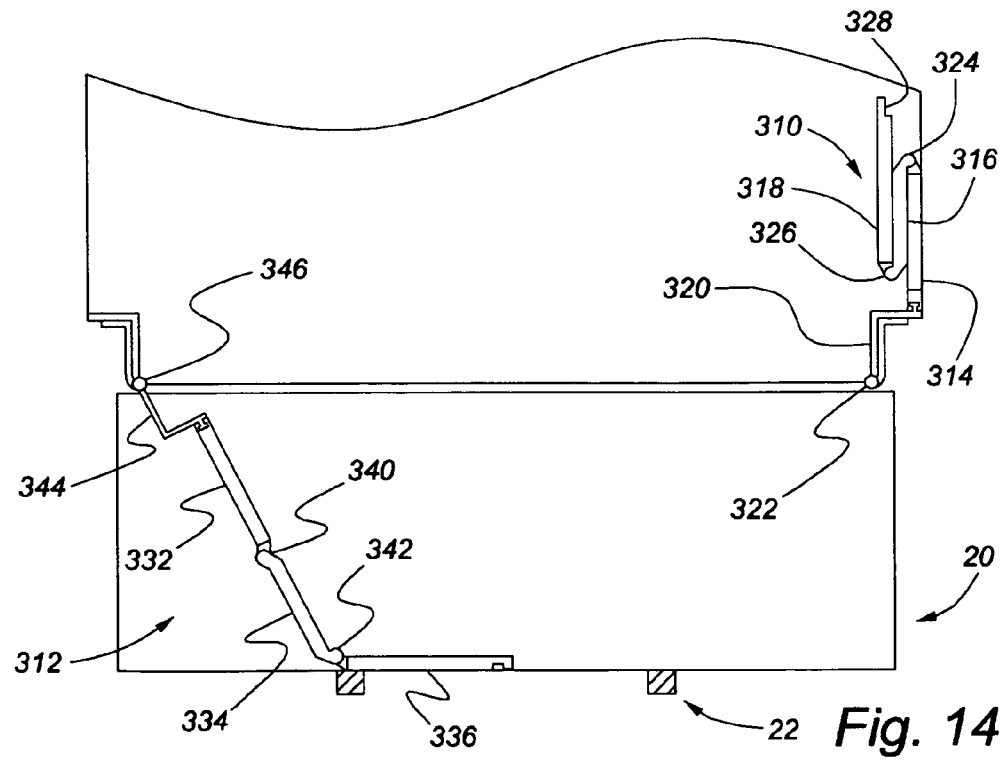

CONFIGURABLE PIVOTING CAGE CARGO RETAINER

CROSS REFERENCE TO RELATED APPLICATIONS

This application is a continuation-in-part of U.S. patent application Ser. No. 10/969,417, filed on Oct. 20, 2004, now U.S. Pat. No. 7,347,473, granted on Mar. 25, 2008, which claims the benefit of United States provisional patent application identified as Application No. 60/515,066, filed Oct. 28, 2003, and is incorporated herein by reference.

FIELD OF THE INVENTION

The present invention relates to cargo retainers that can be utilized in pick-up trucks, and, more particularly, to a pivoting cage cargo retainer that can be positioned in multiple configuration within the cargo bed of a pick-up truck.

BACKGROUND OF THE INVENTION

Conventionally, pickup trucks include a tailgate at the back of a bed that closes off a cargo box. Often times, the truck bed is not long enough to hold the cargo, so truck bed extenders have been developed. The truck bed extenders work in conjunction with the tailgate in order to provide additional length to the bed. Some designs for pickup truck bed extenders have flush mounted extenders that are stowed in the tailgate when not in use. Being out of sight when not in use presents a more attractive vehicle, but these designs are generally lest robust than is desired for cargo support and also provide for only a limited number of types of extender functions.

With the versatility expected of pickup trucks today, there may be many types of extender functions desired. For example, a bed extender (a horizontally extending structure from an open tailgate), a box extender (an upwardly extending structure from an open tailgate that mimics the function of a closed tailgate), an assist step (a downwardly extending structure from an open tailgate that can be stepped-on for assistance in entering the bed), a roof rack type function (an upwardly extending structure from a closed tailgate that works in conjunction with the vehicle roof to support long loads), a bed divider type function (a divider that separates the bed into two main cargo holding areas), and a bed storage area type function, (a divider that creates a small enclosed area in the bed for cargo). Preferably, such functions can be provided with simple, ergonomic movements of the assembly, while still allowing for a generally attractive appearance and taking up minimal space in the vehicle box when not in use.

SUMMARY OF THE INVENTION

In its embodiments, the present invention contemplates a tailgate assembly for use with a motor vehicle having a first generally vertical side wall and a second generally vertical side wall, spaced from the first side wall, and a generally horizontal bed extending therebetween. The tailgate assembly includes a tailgate frame defining a generally hollow cavity therein and adapted to pivotally mount generally between the first and second side walls and being operable in a generally horizontal open position and a generally vertical closed position. The tailgate assembly also preferably includes a supplemental tailgate assembly including: a tailgate extender having a guide system secured generally within the hollow cavity; and a movable frame assembly having a telescoping support extendable from, pivotable relative to, and retained by the guide system, and a cross member connected to the telescoping support and extending generally normal thereto; and a first gate assembly including a first gate, adapted to pivotally couple to the first vertical side wall, and a second gate, pivotally coupled to the first gate, and with the first and second gates adapted to be pivotable to extend toward the movable frame assembly such that the second gate is adjacent to the movable frame assembly.

An advantage of an embodiment of the present invention is that the supplemental tailgate assembly is simple and ergonomic to operate, yet robust enough to restrain the cargo as desired.

Another advantage of an embodiment of the present invention is that a portion of the supplemental tailgate assembly can be easily removed, such that most of the extender functions are still available, but the remaining portion of the supplemental tailgate assembly is hidden and resembles the aesthetically pleasing look of a conventional pickup without a bed extender.

An additional advantage of an embodiment of the present invention is that the highly ergonomic and esthetically pleasing supplemental tailgate assembly still allows for a multi-function bed extender. This supplemental tailgate assembly can be moved to different positions in order to be employed to extend the bed, extend the box, divide the bed, create bed storage areas, provide a roof rack function, and also operate as an assist step.

It is a feature of this invention that the gate assemblies, each being formed of multiple individual panels pivotally connected together, can be oriented in multiple, different operative configurations to provide different cargo retention functions.

It is an object of this invention to overcome the aforementioned disadvantages of the prior art to provide a pivoting cage cargo retainer that is positionable in multiple configurations to provide different cargo retention functions.

It is another feature of this invention that each of the gate assemblies can be configured into a storage container orientation to define a small cargo retention area bounded by three panels of the gate assembly and the side wall of the cargo box.

It is still another feature of this invention to mount the gate assemblies on the rearwardmost D-pillar of the cargo box so that the gate assemblies can form a storage container configuration at the rearwardmost corner of the cargo box.

It is another object of this invention to provide a multi-configurable pivoting cage cargo retainer for a pick-up truck that is durable in construction, inexpensive of manufacture, carefree of maintenance, facile in assemblage, and simple and effective in use.

These and other objects, features and advantages are accomplished according to the instant invention by providing a pivoting cage cargo that is formed of opposing gate assemblies mounted on the rearwardmost D-pillar of a pick-up truck and movable from a folded, collapsed storage position against the respective side walls of the cargo box into multiple selectable operative configurations. The pivoting cage cargo retainer can be positioned in two different transversely extending positions that span the cargo bed when the gate assemblies are connected together. In one transverse position, the coupled gate assemblies cooperate with a lowered tailgate to provide a bed extension function. The other transverse position spans across the cargo bed to provide a divider function. Each gate assembly is also positionable into a storage container configuration that defines a small cargo retention area adjacent the side wall for the retention of small objects, such as grocery bags. A latching mechanism retains the gate assembly next to the side wall.

BRIEF DESCRIPTION OF THE DRAWINGS

The advantages of this invention will become apparent upon consideration of the following detailed disclosure of the invention, especially when taken in conjunction with the accompanying drawings wherein:

FIG. 13 is a schematic view of a vehicle having a tailgate, shown in an open, generally horizontal position, with a tailgate extender extending from the tailgate in an upwardly extending position, and with a left hand portion of a gate assembly shown in a box extending position and a right hand portion of the gate assembly shown in a stowed position, in accordance with a second embodiment of the present invention;

FIG. 14 is a schematic, plan view of the portion of the vehicle illustrated in FIG. 13;

DETAILED DESCRIPTION OF THE PREFERRED EMBODIMENT

Figure 1:
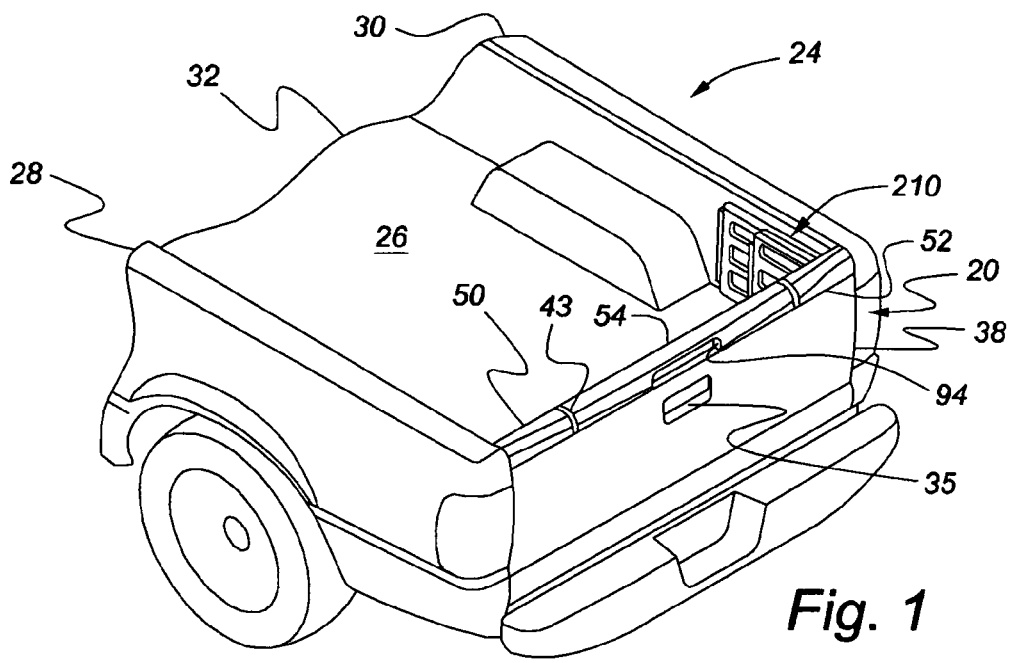
FIG. 1 is a perspective view of a rear portion of a vehicle having a tailgate and a gate assembly, with the tailgate shown in a generally vertical, closed position, and the gate assembly shown in a stowed position, in accordance with the present invention.
Figure 2:
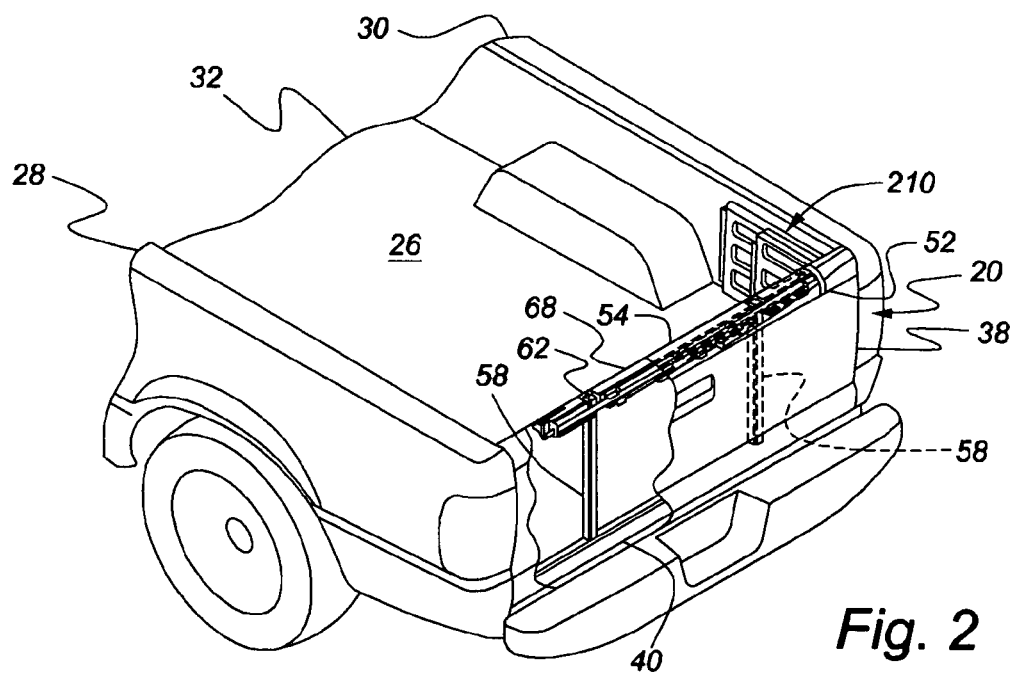
FIG. 2 is a partially cutaway perspective view similar to FIG. 1, with the cutaway area revealing the tailgate extender retracted into its stowed position within the vehicle tailgate.

FIGS. 1-12 illustrate a first embodiment of the present invention with a tailgate 20 that mounts to a vehicle 24—preferably a pickup truck. The tailgate 20 includes a tailgate extender 22, part of a supplemental tailgate assembly, mounted therein. The vehicle 24 includes a box 26 that is defined by a left rear quarter panel 28, which forms a first vertical surface of the box 26; a right rear quarter panel 30, which forms a second vertical surface of the box 28; a bed 32, which extends between the two panels 28, 30 to form a cargo floor; and the tailgate 20, which is pivotable between a generally vertical closed position and a generally horizontal open position.

The tailgate 20 includes a pair of conventional tailgate hinges 34 that preferably cooperate with the side panels 28, 30, and a pair of tailgate supports 36, which support the tailgate 20 when in its horizontal position. A tailgate handle 35 mounts to an outer panel 38, and functions in a conventional manner. The tailgate release mechanism and the handle 35, as well as tailgate latches, are conventional and well known in the art and so are not shown or discussed in any more detail herein. The tailgate 20 is comprised of a tailgate frame 37 including the outer panel 38, which forms the outer finished surface of the tailgate 20, and a tailgate frame inner panel 40, which mounts to the outer panel 38 and forms the inner surface and sides 42 of the tailgate 20. A tailgate reinforcement channel 48 may mount along the top of the tailgate outer panel 38 and inner panel 40. The outer panel 38, reinforcement channel 48, and inner panel 40 combine to form a pair of upper surfaces with a gap 43 therebetween. Other tailgate reinforcements (not shown) may be employed within the tailgate frame 37 in order to provide structural support to the frame outer and inner panels 38, 40. Also, the tailgate frame 37 includes a pair of structural stops 152 mounted thereon.

A left tailgate molding 50 and a right tailgate molding 52 mounts on top of the upper surfaces. They may be made of colored plastic that is the desired color of the parts; this eliminates the need to paint them. In this way, the tailgate moldings 50, 52 will help to prevent paint scratches on metal parts when cargo is being loaded over the top of a closed tailgate 20.

The components that make up the tailgate frame 37 are formed so that a hollow internal cavity is created. Within this cavity, the tailgate extender 22 is retained. The tailgate extender 22 may include a pivotable molding 54, a movable frame portion 56, and guide rails 58. The guide rails 58 may be hollow, generally rectangular tubes that are fixed to the tailgate frame 37 and support the movable frame portion 56 as it is telescopically extended from and retracted into the guide rails 58.

Each guide rail 58 may include pivot brackets 64 mounted on top that cooperate with the movable frame portion 56 to allow for both pivoting of the movable frame portion 56 relative to the tailgate 20 and preventing the movable frame portion 56 from being separated from the guide rails 58. The pivot brackets 64 may be fastened to the reinforcement channel 48, and the bottoms of the guide rails 58 to the inner panel 40, in order to help secure the guide rails 58 to the tailgate 20. The pivot brackets 64 are located adjacent to the structural stops 152, thus allowing the structural stops 152 to set the angle of the tailgate extender 22 when in an assist step position.

The movable frame portion 56 includes a pair of support tubes 62 that are each received telescopically in a respective one of the guide rails 58. Each of the guide rails 58 may include a block spacer 55 mounted therein against which the support tubes 62 can slide. The block spacers 55 may be formed of plastic to minimize potential scratching of the support tubes 62 as they slide relative to the guide rails 58. Each of the support tubes 62 includes a hinge pin 66 that cooperates with slots 65 in the pivot brackets 64, when fully extended, in order to allow for pivoting of the movable frame portion 56 relative to the guide rails 58 while still allowing the guide rails 58 to retain and support the support tubes 62. The hinge pins 66 may be secured to the support tubes by welding, interference fit, or some other suitable means. Each of the support tubes 62 also connects to a corresponding one of the latching assemblies 60. The latching assemblies 60 releasably fix the support tubes 62 to a certain limited number of telescopically extended positions relative to the guide rails 58. When extended out partially, the guide rails 58 will hold the support tubes 62 parallel to it, thus creating a longer effective bed for the truck when the tailgate 20 is in its horizontal position.

Each of the movable frame portion's support tubes 62 is hollow so they can receive a respective one of the two latching assemblies 60 therein. More specifically, latch housings 78 extend through each of the support tubes 62 and connect, at their upper ends, to the lower ends of latch actuation rods 80 via retainer barrels 81. The upper ends of the latch actuation rods 80 are secured, via retaining clips 83, to release levers 82, which are part of the pivotable molding 54, in order to form a release hinge 84.

Even though, for some features of the tailgate extender 22, only the feature on the left or right side is shown, the tailgate extender 22 is generally symmetrical right to left, so the opposite side is just the mirror image of the feature shown on that first side. Accordingly, for the description herein, if the feature is shown on only a first side, the feature on the second, opposite side is presumed to be the mirror image of the feature shown on the first side.

The lower ends of the latch housings 78 connect to latch return springs 85, which, in turn, are connected to the hinge pins 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the support tubes 62 relative to the guide rails.

Each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the support tubes 62. Also, when aligned, the retention tabs 96 are biased by the springs 95 to extend through engagement slots 98 in the guide rails 58 and through engagement slots 61 in insert plates 59. The insert plates may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the support tubes 62 relative to the guide rails 58. This small adjustability may allow one to make sure that the top of the pivotable molding 54 is flush with the tops of the tailgate moldings 50, 52 when the tailgate extender 22 is in its stowed position. Each latch housing 78 also includes internal flanges 99, located within the slot 93, that engage with release ramps 100 on the latch blade 87. The latching assemblies 60 disclosed herein are one example of means for releasably retaining the tailgate extender 22. Accordingly, other latching assemblies may be employed instead, if so desired.

Figure 8:
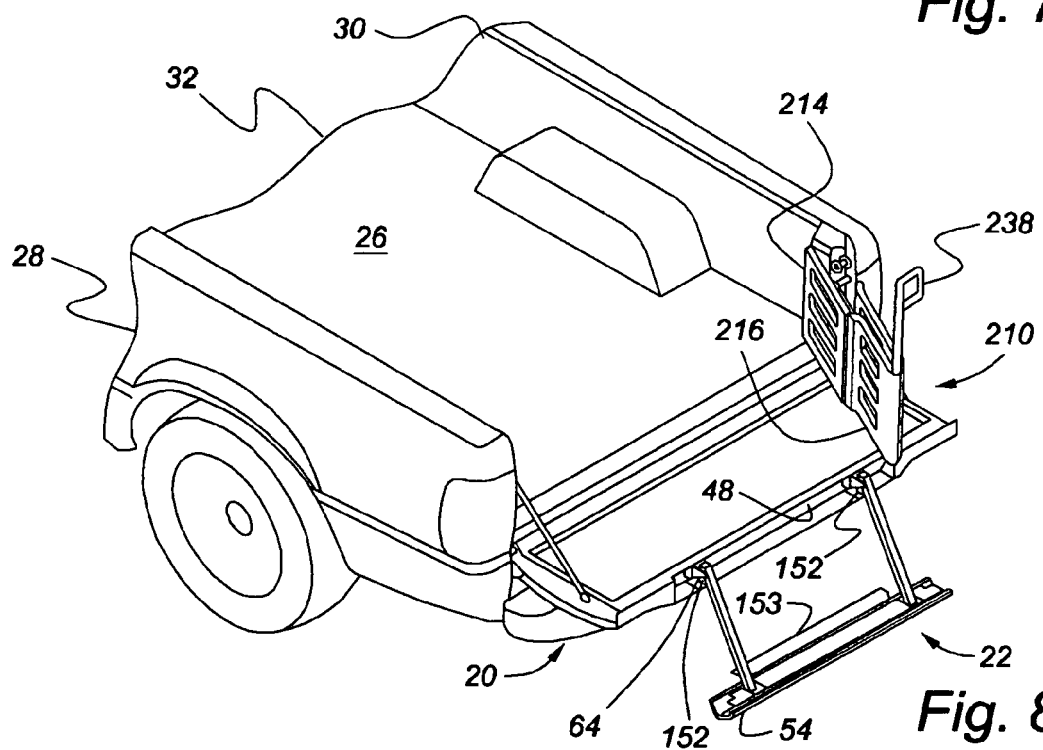
FIG. 8 is a partial, perspective view similar to FIG. 5, but with the tailgate extender shown in a fully extended, downwardly rotated position and the right hand portion of the gate assembly shown in a step assist position.

The movable frame portion 56 also includes a cross member assembly 68 that connects to the tops of the support tubes 62. The cross member assembly 68 includes cross members that form a support frame 70, as well as bracketry for pivot mounts 73 mounted on the support frame 70. The support frame 70 may be formed strong enough to support the weight of one or more people standing on it. Also, the cross member assembly 68 includes a flip step 153 pivotally mounted thereto. This way, when the movable frame portion 56 is extended out and pivoted downward toward the ground and against the stops 152, the flip step 153 can be pivoted away from the support frame 70, with the flip step 153 and support frame 70 usable as a step, (as best seen in FIG. 8).

Figure 9:
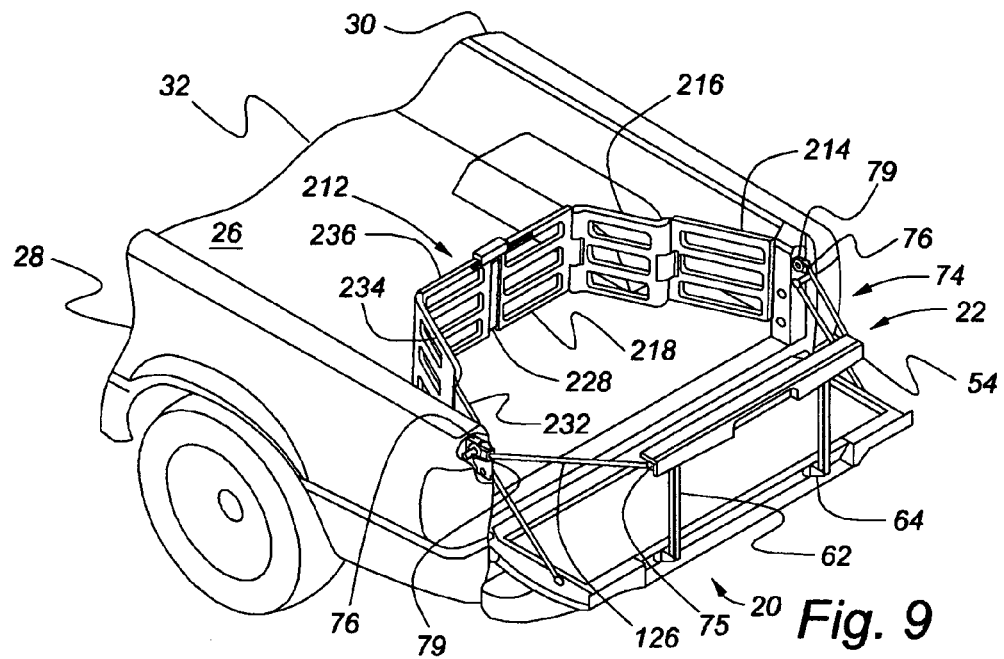
FIG. 9 is a partial, perspective view similar to FIG. 5, but with the tailgate extender shown in a fully extended, upwardly rotated position and the gate assembly shown in a box divider position.
Figure 10:
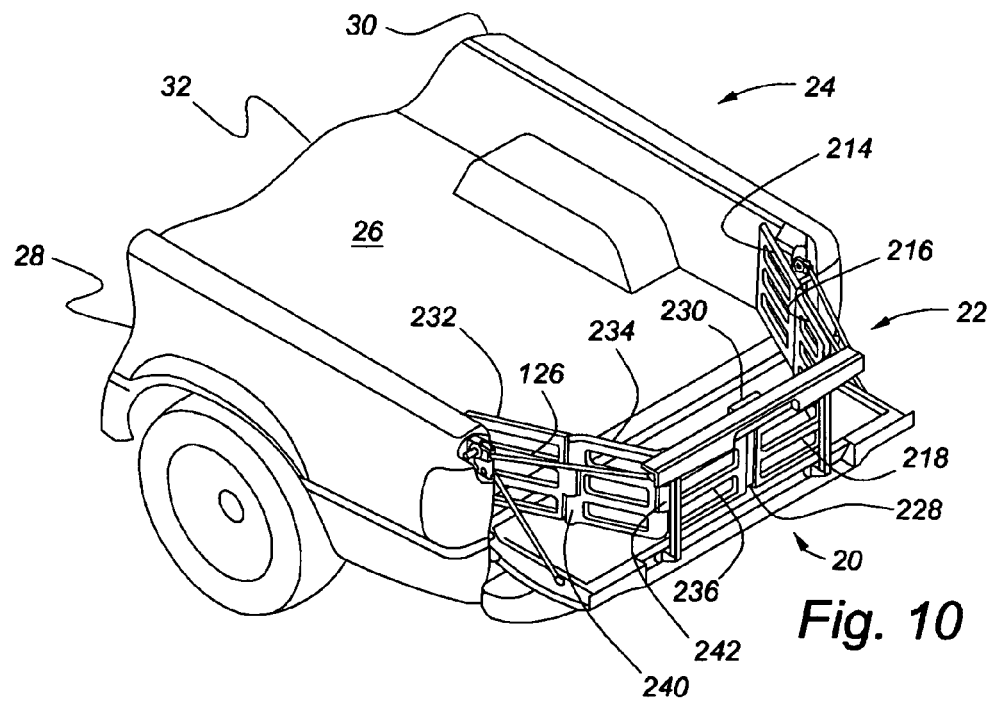
FIG. 10 is a partial, perspective view similar to FIG. 9, but with the gate assembly shown in a box extender position.
Figure 11:
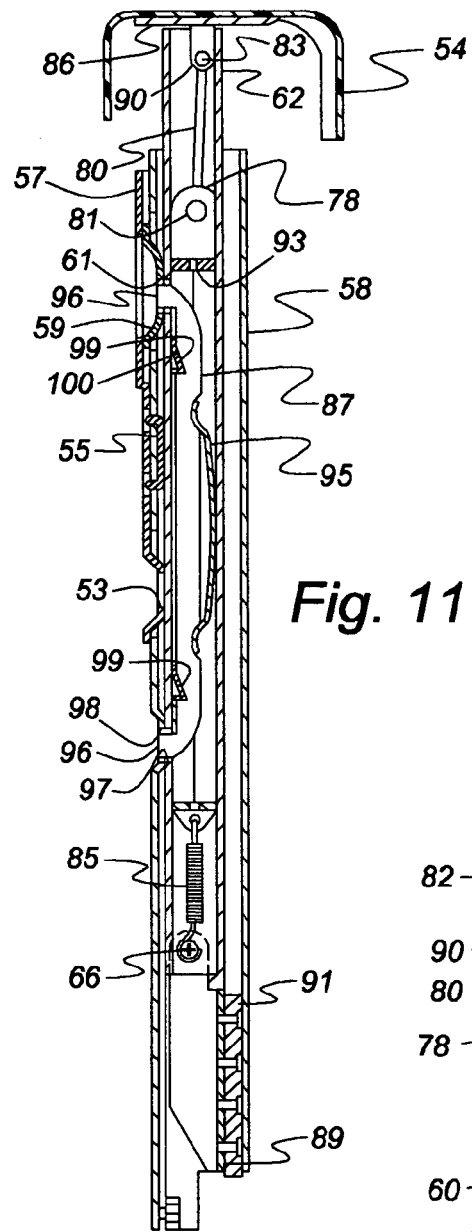
FIG. 11 is a cross section of the tailgate extender latching mechanism in accordance with the present invention.
Figure 12:
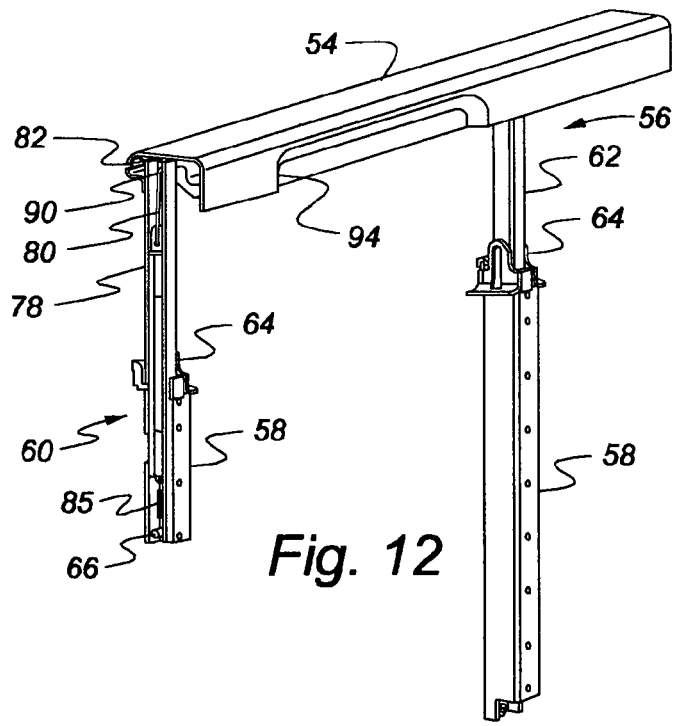
FIG. 12 illustrates a rear perspective, partially sectioned view similar to FIG. 4, but with the section cut taken at a different location.
Figure 15:
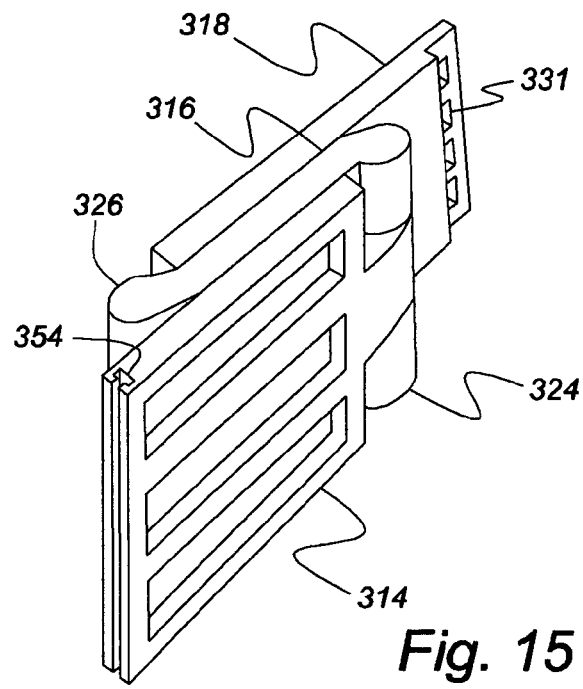
FIG. 15 is a perspective view of a right hand gate assembly in its stowed position, in accordance with the second embodiment of the present invention.
Figure 16:
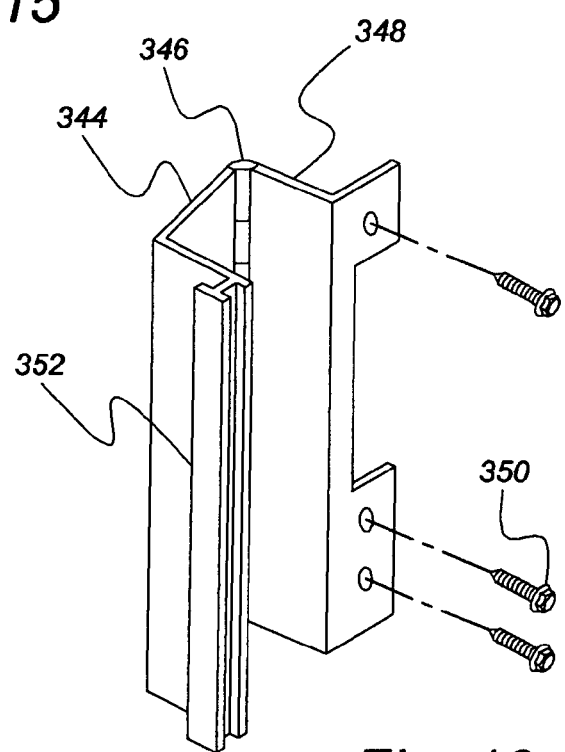
FIG. 16 is a perspective view of a hinge for a left hand gate assembly, in accordance with the second embodiment of the present invention.

The cross member assembly 68 may telescopically receive a pair of lock rod assemblies 74, with each having a pivot hinge 75 at one end of a rod 126 and a lock rod latch 76 at the far end. The pivot hinges 75 allow the lock rod assemblies 74 to be extended toward the truck so that the lock rod latches 76 can hook to supports 79 on the truck box 26 in order to allow the movable frame portion 56 to be held in its upright position, thus creating a box extender, (as best seen in FIGS. 9 and 10). The supports 79 may be just the conventional latch pins used to hold the tailgate 20 in its closed position, rather than separate supports mounted on the vehicle 24.

The pivot mounts 73 may connect to and mount the pivotable molding 54 about a pivot axis 77. The pivotable molding 54 may be formed from plastic, or other suitable material, such as, for example, a thirty percent glass filled polypropylene. The release levers 82 may be molded into the pivotable molding 54 while it is being formed or affixed thereto after forming by, for example, friction welding. Each release lever 82 includes a base 86 that is adjacent to the pivotable molding 54, a pivot flange 88 extending from one end of the base 86, and a release flange 90 extending from the other end. Each pivot flange 88 pivotally mounts about one of the pivot mounts 73 and is secured with a hinge rod 92. The pivot flange 88, then, will allow the pivotable molding 54 to pivot about the pivot axis 77. Each release flange 90 is offset from the pivot axis 77 and is connected to one of the latch actuation rods 80. Thus, when the pivotable molding 54 is pivoted, the release flanges 90 will pull up on the latch actuation rods 80. The latching assemblies 60 unlatch, allowing the support tubes 62 to slide relative to the guide rails 58, when the latch actuation rods 80 are pulled upwards, and re-engage when the latch actuation rods 80 are released.

The pivotable molding 54 may be molded with the plastic being the desired final color so that it does not have to be painted. The pivotable molding 54 may also include a handle pocket 94 that is molded into the rear surface of the pivotable molding 54. The handle pocket 94 provides for ease of gripping and pivoting the pivotable molding 54 when deploying the tailgate extender 22. The pivotable molding 54 also may have an overall width that is just smaller than the gap 43 formed between the two tailgate moldings 50, 52, and has a top surface that is flush with the top surfaces of the two tailgate moldings 50, 52. Additionally, if so desired, the two tailgate moldings 50, 52 may include recessed flanges (not shown) that nest under the edges of the pivotable molding 54. Accordingly, the tailgate extender 22, when in its fully retracted position, will blend-in with the tailgate 20, having an appearance that is very similar to a tailgate that does not include a tailgate extender. Thus, the tailgate extender 22 can be included without detracting from the esthetically pleasing look of the vehicle, and, moreover, the pivotable molding 54 will still allow for cargo to be slid into and out of the box 26 over the top of a closed tailgate 20 without creating paint scratch concerns. While the latching assemblies 60 are shown connected to and actuated by the pivotable molding 54, they may be connected to and actuated by a more conventional handle instead, if so desired.

The supplemental tailgate assembly, in addition to the tailgate extender 22, also includes a right hand gate assembly 210 and a left hand gate assembly 212. The right hand gate assembly 210 includes a first right hand gate 214, a second right hand gate 216 and a third right hand gate 218. The right hand gate assembly 210 also includes a right hand hinge plate 220, which is bolted to the right hand rear quarter panel 30 on the inside of the box 26, and a first right hand hinge 222, which pivotally couples the first right hand gate 214 to the right hand hinge plate 220. A second right hand hinge 224 pivotally couples the first right hand gate 214 to the second right hand gate 216, and a third right hand hinge 226 pivotally couples the second right hand gate 216 to the third right hand gate 218. The third right hand gate 218 also includes a right hand gate connector 228 extending from the main portion of the gate 218, and a slide latch 230 mounted on top of and slidable relative to the gate 218. A removable step assist handle 238 can mount to the tops of the second and third right hand gates above the third right hand hinge 226, (as seen in FIG. 8).

The left hand tailgate assembly 212 includes a first left hand gate 232, a second left hand gate 234, and a third left hand gate 236. The first left hand gate 232 connects to the left rear quarter panel 28 of the box 26 with a first left hand hinge, similar to the right hand side. A second left hand hinge 240 pivotally couples the first left hand gate 232 to the second left hand gate 234, and a third left hand hinge 242 pivotally couples the second left hand gate 23 to the third left hand gate 236.

The operation of the supplemental tailgate, including the tailgate extender 22 as well as the right and left hand 210, 212 gate assemblies, will now be described. The supplemental tailgate assembly is shown in its fully stowed position in FIGS. 1, 2 and 5. In this position, the tailgate extender 22 is stowed inside the tailgate 20, with only the pivotable molding 54 exposed, which blends in with the other tailgate moldings 50, 52. The right and left hand gate assemblies 210, 212 are each folded up against a side of the box 26, minimizing the potential for interference with cargo loaded in the box 26. From this position, either the tailgate extender 22, the right and left hand gate assemblies 210, 212, or both may be advantageously deployed in any number of cargo and assist positions.

Figure 5:
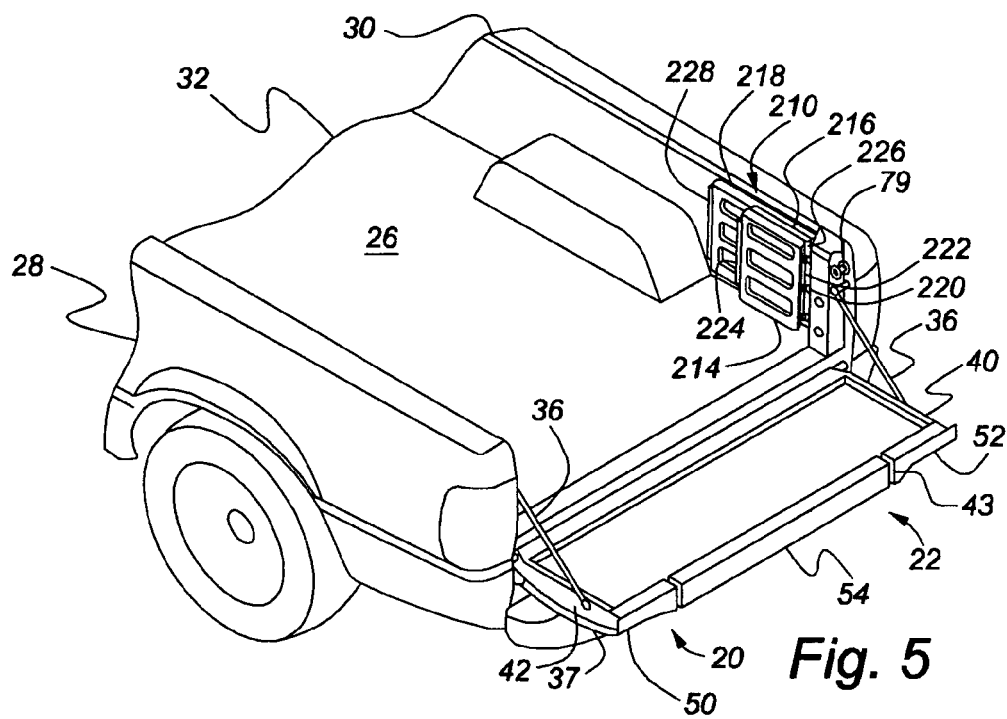
FIG. 5 is a partial, perspective view similar to FIG. 1, but with the tailgate shown in its open, generally horizontal position.

The tailgate extender 22 may be easily released from its stowed position within the tailgate 20 while the tailgate 20 is in its open or closed position. Although, for the most advantageous use of the tailgate extender functions, the tailgate 20 will be in its horizontal open position when released (as best seen in FIG. 5), with some type of gravity latch (not shown) that prevents release when the tailgate 20 is in its vertical position.

To deploy the tailgate extender 20 from its stowed position, one grasps the pivotable molding 54 and pivots it relative to the pivot axis 77. This will cause the release flanges 90 to pull up on the latch actuation rods 80, which, in turn, will pull up on the latch housings 78 against the bias of the latch return springs 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released, but are not necessary for operation of this invention.

Figure 7:
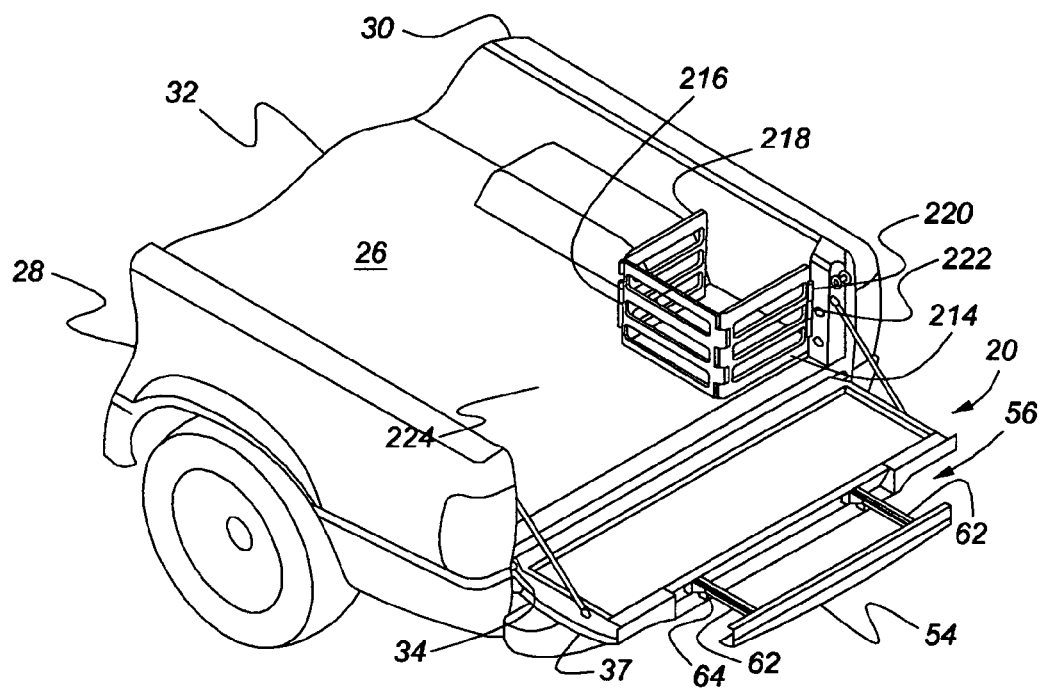
FIG. 7 is a partial, perspective view similar to FIG. 5, but with the tailgate extender shown in a partially extended position and the right hand portion of the gate assembly shown in a storage container position.

One then pulls on the tailgate extender 22 to telescopically slide the support tubes 62 relative to the guide rails 58, while allowing the pivotable molding 54 to pivot back into its latch engaged position. Once the movable frame portion 56 is slid out to a predetermined extended position relative to the tailgate 20, the retention tabs 96 on the lower end of the latch blades 87 will engage an engagement slot 53 or engagement slot 61 (depending upon how far the support tubes 62 are slid prior to releasing the pivotable molding 54), thus fixing the movable frame portion 56 relative to the guide rails 58. Also, at these extended positions, the support tubes 62 still remain partially within the guide rails 58 so that the two will not pivot relative to one another. With the tailgate 20 in its horizontal open position, the tailgate extender 22 is now in its bed extender position, (as best seen in FIG. 7). While only a limited number of bed extender positions are discussed herein, the tailgate extender 22 may have additional bed extender positions by providing additional engagement slots, if so desired.

Figure 6:
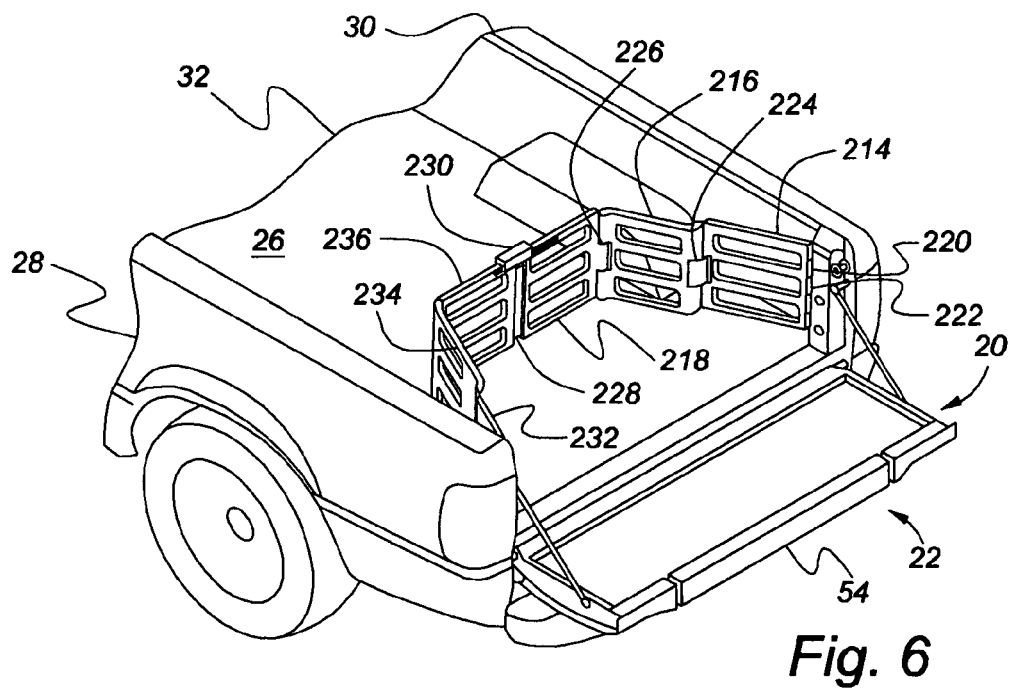
FIG. 6 is a partial, perspective view similar to FIG. 5, but with the gate assembly shown in a box divider position.

With the tailgate 20 in its open position, the right and/or left hand gate assemblies 210, 212 can be deployed in various positions to compliment the tailgate extender 22 function. For example, first right hand gate 214 may be pivoted to it extends out laterally into the box 26, with the second right hand gate 216 pivoted about normal to the first gate 214, and the third right hand gate 218 is pivoted about normal to the second gate 216 back toward the wall of the box 26, (as best seen in FIG. 7). In this way, when the tailgate 20 is open and the tailgate extender 22 is in its tailgate extension position, in order to allow the bed 32 to hold long cargo, the right hand gate assembly 210 can be used as a bed storage area for smaller cargo items. These smaller cargo items, then, will not fall out of the box 26 while the vehicle 24 is moving. In another example, the right and left hand gate assemblies 210, 212 may be pivoted forward and toward each other, with the slide latch 230 used to secure the third right hand tailgate 218 to the third left hand tailgate 236, (as best seen in FIG. 6). The supplemental tailgate assembly, then provides a box divider type of function with two large cargo areas in the box 26. This bed divider function may also be employed with the tailgate 20 open and the tailgate extender 22 extending out horizontally, (as the extender 22 is shown in FIG. 7). This effectively increases the length of the second cargo area in the box 26.

Figure 3:
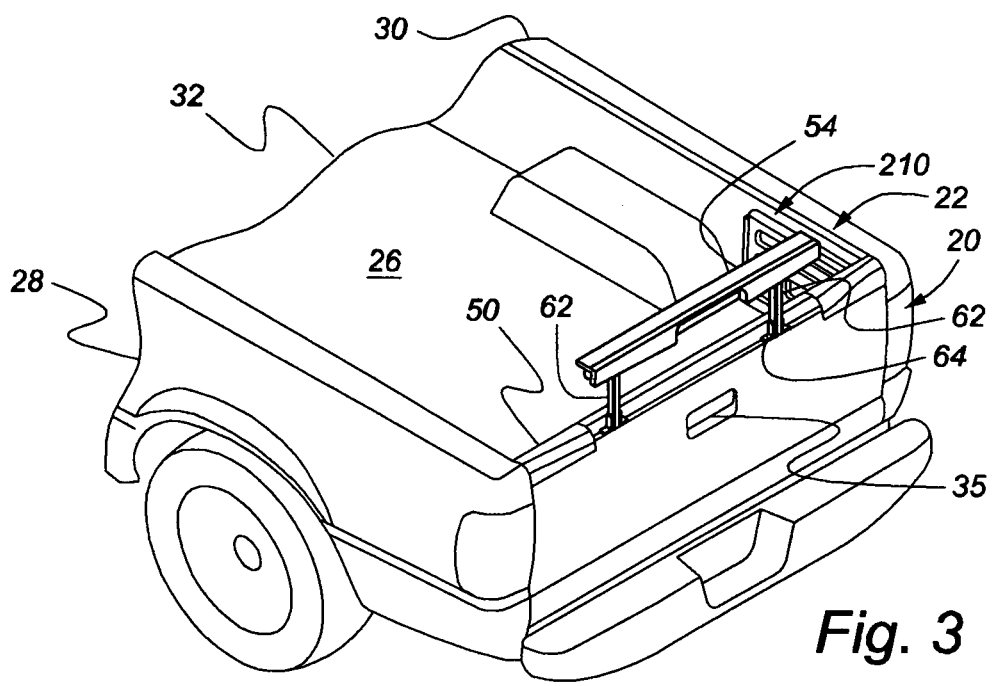
FIG. 3 is a partial, perspective view similar to FIG. 1, but with the tailgate extender shown in a partially extended position.
Figure 4:
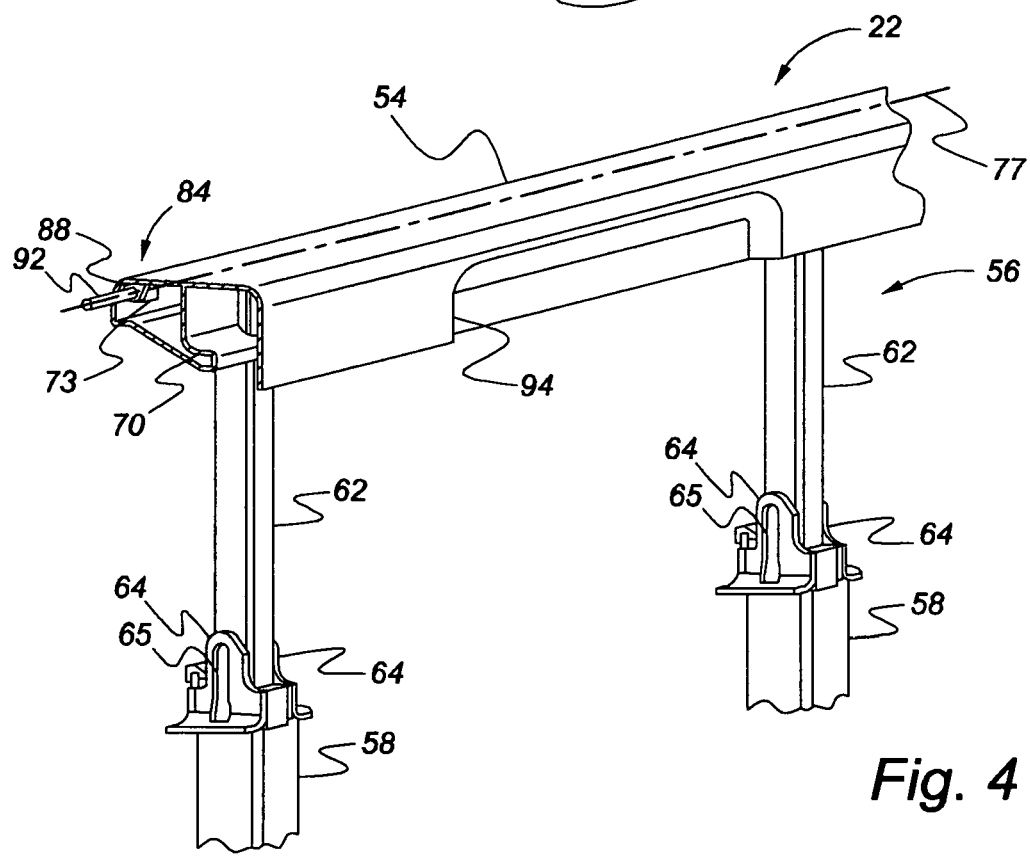
FIG. 4 is a perspective, partially sectioned view of the tailgate extender, but not illustrating lock rod assemblies and components, in accordance with the present invention.

Additionally, with the tailgate extender 22 still in the first extended position, the tailgate 20 may be closed, (as best seen in FIG. 3). The tailgate extender 22 can now be advantageously employed as a roof rack type of support. Very long items, such as ladders or canoes can be supported by both the vehicle cab roof (not shown) and by the top of the tailgate extender 22. The right and left hand gate assemblies 210, 212 of course may be employed in creating small cargo areas (as the right hand gate assembly 210 is shown in FIG. 7) or a box divider cargo areas (as the gate assemblies 210, 212 are shown in FIG. 6) without interfering with the roof rack type of function.

With the tailgate extender 22 in its first extended position, the pivotable molding 54 may then be pivoted again to release the latching assemblies 60 once more. One may then pull the tailgate extender 22 out to its fully extended position relative to the open tailgate 20. In this fully extended position, the support tubes 62 will be pulled out of the guide rails 58, with the hinge pins 66 engaged in the slots 65 of the pivot brackets 64. This will allow the tailgate extender 22 to be pivoted upward or downward, depending upon the particular functionality desired.

The movable frame portion 56, from its fully extended position, can be pivoted downward until the support tubes 62 engage the structural stops 152, with the tailgate extender 22 extending in a generally vertical orientation. In this position, the flip step 153 can be pivoted away from the support frame 70, with the flip step and the support frame 70 now acting as an assist step, (as best seen in FIG. 8). In this downward position, the pivotable molding 54 is on the underside of the movable frame portion 56, so it will not be stepped-on and damaged by the operator. Also, the support tubes 62 are preferably short enough that the pivotable molding 54 is spaced above the ground upon which the vehicle is standing. In this way, the molding 54 will not be scraped or damaged by contact with the ground, and the support frame 70, being higher off of the ground, will provide a better assist step function. In order to further assist one who is loading and unloading cargo, the right hand gate assembly 210 may be deployed into a step assist position. The first right hand gate 214 is pivoted to extend aft in the general direction of the assist step, the second right hand gate 216 is pivoted to extend aft and generally parallel to the first 214, and the third right hand gate 218 is pivoted to be folded against the second gate 216. The optional step assist handle 238 can then be mounted on the second and third gates 216, 218 above the third right hand hinge 226, (as best seen in FIG. 8). Then, one stepping on the tailgate extender 22 in its step assist position can also grab the step assist handle 238 to steady himself.

The movable frame portion 56, from its fully extended position, can also be pivoted upward into an upward extending vertical position, to serve as a box extender. The lock rod assemblies 74 are deployed and latched onto the supports 79 on the box 26 in order to hold the movable frame portion 56 in the upright position. Again, the supports 79 may be the existing pin strikers that are normally used to hold the tailgate 20 in its closed position. The tailgate extender 22 can now hold cargo in the box 26 against aft directed loads on the cargo. The right and left hand gate assemblies 210, 212 can also be moved to their box divider position (as best seen in FIG. 9), thus creating two smaller box areas in the larger box 26. The forward box area is better suited to holding smaller cargo due to the large openings through the tailgate extender 22 in this position.

If one wishes, however, to be able to carry smaller cargo with an extended box area, then the right and left hand gate assemblies 210, 212 can be deployed to extend toward one another and rearwardly, (as best seen in FIG. 10). With the supplemental tailgate assembly deployed in this way, the gate assemblies 210, 212 will assure that smaller cargo is held within the box 26, while the tailgate extender 22 surrounds and supports the gate assemblies 210, 212. The lock rod assemblies 74 will support the right hand and left hand first and second gates 214, 216, 232, 234, while the support tubes 62 and cross member assembly 68 will support the right and left hand third gates 218, 236. Thus, the gate assemblies 210, 212 are supported at their hinge locations 224, 226, 240, 242 and all of the way to the top, which assures a robust support system for any cargo that with aft directed loads.

Performing any of these deployment operations generally in reverse will allow one to easily stow and latch the tailgate extender 22 back into the tailgate 20 and the right and left hand gate assemblies 210, 212 out of the way against the sides of the box 26. Hence, an easy to operate and ergonomic supplemental tailgate is provided for the vehicle 24.

FIGS. 13-16 illustrate a second embodiment of the present invention. In this embodiment, the right hand gate assembly 310 is now pivotally connected to a right hand hinge plate 320 and the left hand gate assembly 312 is pivotally connected to a left hand hinge plate 344 in order to provide more flexibility the positioning of the gate assemblies 310, 312.

The right hand hinge plate 320 is pivotally connected to a right hand support plate 349 via right hand hinge 322. The right hand support plate 349, in turn, is fastened to the box 26 in order to secure the right hand gate assembly 310 to the vehicle 24. The right hand hinge plate 320 includes a tongue 353 that slides within a groove 354 in a first right hand gate 314. The tongue and groove arrangement allows the right hand gates, when not needed in the vehicle 24, to be easily and quickly removed from the vehicle 24 by merely sliding the groove off of the tongue. The first right hand gate 314 is also pivotally connected to the second right hand gate 316 via a second right hand hinge 324. The second right hand gate 316, in turn, is pivotally connected to the third right hand gate 318 via a third right hand hinge 326. The third right hand gate 318 also includes a right hand gate connector 328 extending from its far end, with catch recesses 331 molded therein.

The left hinge plate 344 is pivotally connected to a left hand support plate 348 via a left hand hinge 346. The left hand support plate 348 is also fastened to the box 26 employing, for example, screws 350 or a releasable pin (as discussed relative to the third embodiment below). The left hand hinge plate 344 includes a tongue 352 that slides within a groove 355 in a first left hand gate 332. This second tongue and groove arrangement also allows for easy removal of the left hand gates when not needed in the vehicle 24. The first left hand gate 332 is also pivotally connected to the second left hand gate 334 via a second left hand hinge 340. The second left hand gate 334, in turn, is pivotally connected to the third left hand gate 336 via a third left hand hinge 342. The third left hand gate 336 also includes a left hand gate connector 329 extending from its far end, with connector protrusions 330 extending therefrom. The connector protrusions 330 are sized and spaced to fit within the catch recesses 331 in order to secure the third right hand gate 318 to the third left hand gate 336 when desired to do so.

The right and left hand gate assemblies 310, 312 and tailgate extender 22 of the supplemental tailgate can be employed, along with the tailgate 20, to perform the functions discussed above with regard to the first embodiment. The deployment and stowage processes are essentially the same, but with the added flexibility of the hinge plates 320, 244, and a more simple and quick way to completely remove the gates from the box 26 when so desired.

Figure 17:
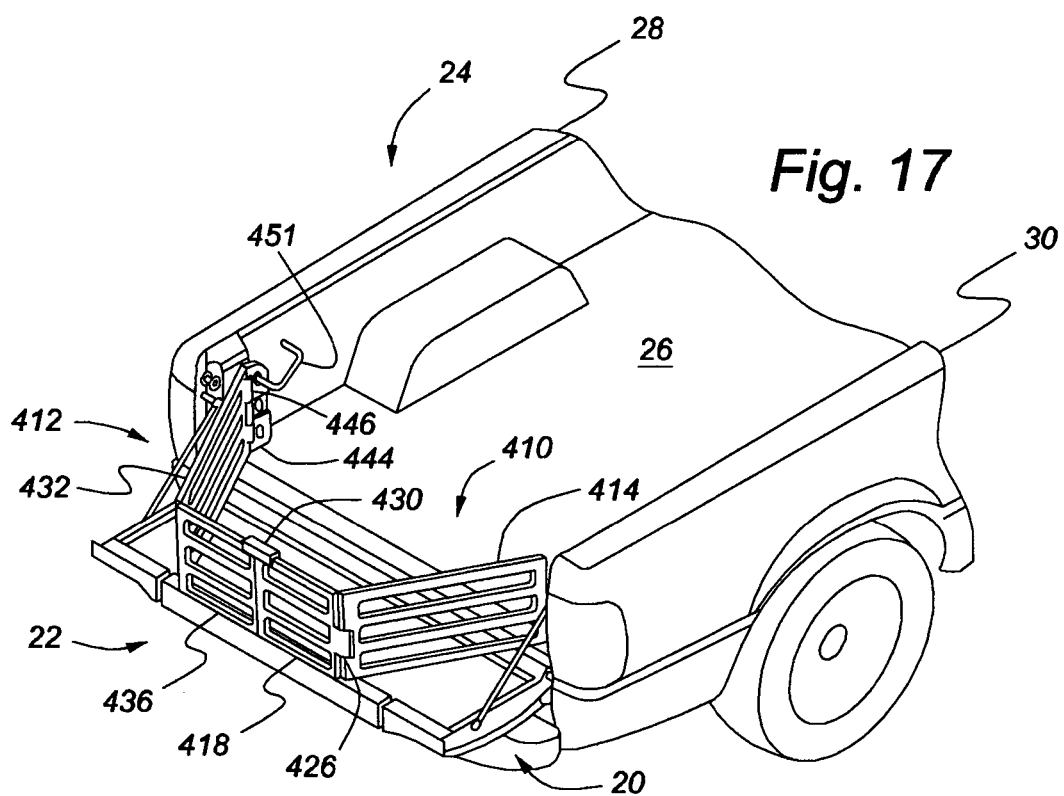
FIG. 17 is a partial, perspective view of a vehicle with a tailgate in an open, generally horizontal position, and a gate assembly in a box extender position, according to a third embodiment of the present invention.
Figure 18:
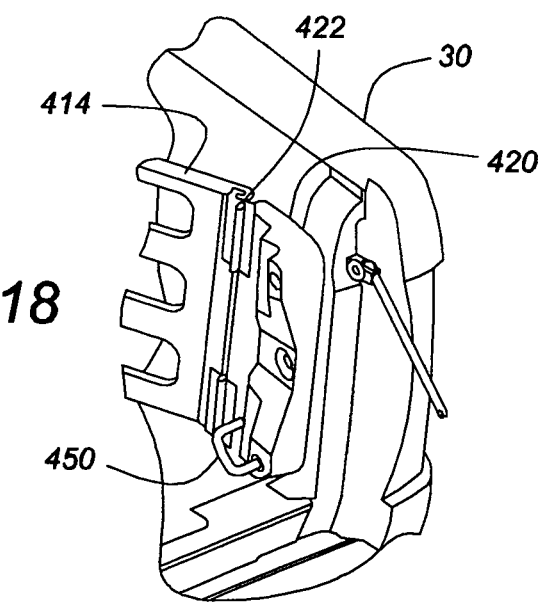
FIG. 18 is a perspective view of a hinge according to the third embodiment of the present invention.

FIGS. 17 and 18 illustrate a third embodiment of the present invention. In this embodiment, the right hand gate assembly 410 and the left hand gate assembly 412 have fewer gate sections and hinges in order to simplify the design. Also, a quick release hinge attachment may be employed.

The first right hand gate 414 may be longer than the second right hand gate 418 and pivotally mounts to the right rear quarter panel 30 of the box 26 via a hinge 422 and pivotable panel 420. A quick release hinge pin 450 may secure the pivotable panel 420 to the box 26. The quick release hinge pin 450 may be generally C-shaped in order to make it easier for one to grip and manipulate the pin. A right hand outer hinge 426 pivotally connects the first right hand gate 414 to the second right hand gate 418. A slide latch 430 may mount on top of the second right hand gate 418. While a slide latch 430 is shown for holding the two gate assemblies 410, 412 together, other types of suitable mechanisms may also be employed instead. For example, the gate assemblies 410, 412 may have quarter turn pins (not shown) that engage center overlapping sections.

The left hand gate assembly 412 includes a first left hand gate 432 that pivotally connects to a left hand pivotable panel 444 via a left hand hinge 446. The left hand pivotable panel 444 is secured to the left rear quarter panel 28 of the box 30 by a quick release pin 451, which may also be generally C-shaped as discussed above. A second left hand gate 436 pivotally mounts to the first left hand gate 432 via a second left hand hinge (not shown, but similar to the right hand side).

The right and left hand gate assemblies 410, 412 and the tailgate extender 22 of the supplemental tailgate, along with the tailgate 20, can be employed to perform the functions discussed above relative to the first embodiment. The deployment and stowage processes are similar, but with somewhat less flexibility in positioning the gate assemblies 410, 412 due to the reduced number of gates and hinges. In addition, with the modified pivotable panels 420, 444, hinges 422, 446, and quick release hinge pins 450, 451, the procedure for switching the gate assemblies 410, 412 from a box divider position to a box extender position is modified somewhat. In the stowed and box divider positions, the pivotable panels 420, 444 are oriented so that the hinges 422, 446 are forward of the pivotable panels 420, 444, (as can be seen in FIG. 18). In this orientation, the free ends of the quick release pins 450, 451 may be employed to engage and hold the gate assemblies 410, 412 in their stowed positions when not in use, if so desired. In order to switch from the stowed or box divider position, one pulls the quick release hinge pins 450, 451, flips over the gate assemblies 410, 412, and then re-inserts the hinge pins 450, 451. The pivotable panels 420, 444 are now oriented so that the hinges 422, 446 are aft of the pivotable panels 420, 444, (as can be seen in FIG. 17).

Figure 19:
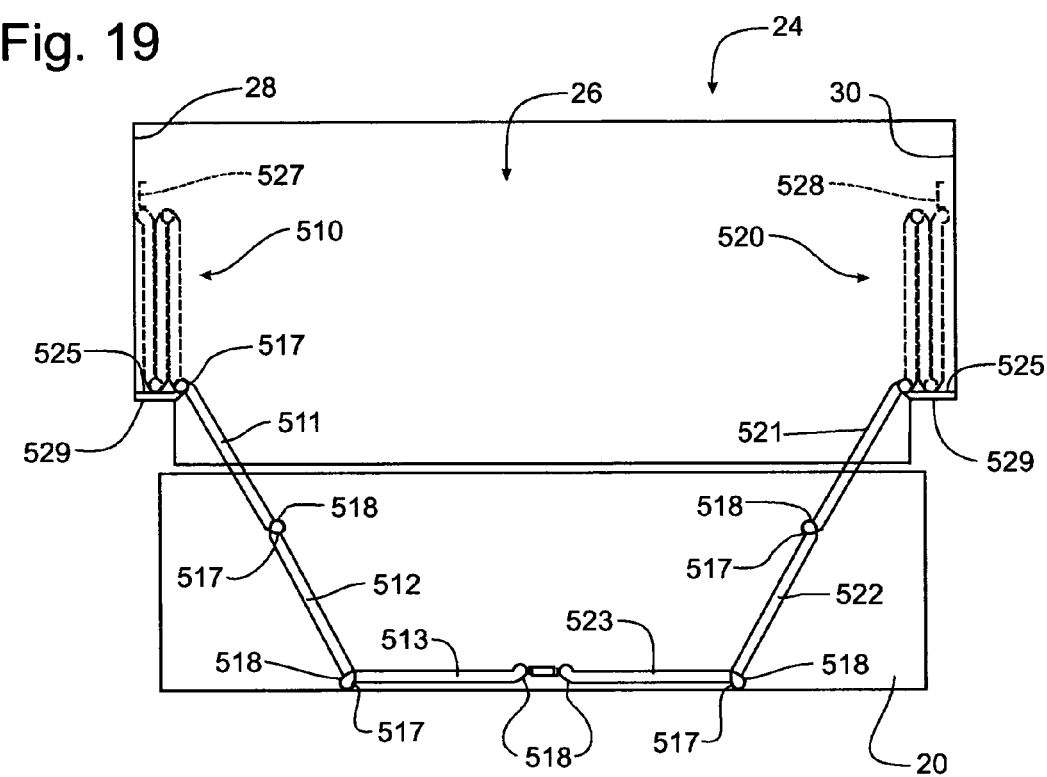
FIG. 19 is a schematic plan view of the rear portion of the vehicle with the tailgate lowered, similar to that of FIG. 14, but depicting an alternative embodiment of the gate assemblies, the stored positions of the gate assemblies being depicted in phantom while the gate assemblies are depicted in a rearwardly deployed position.
Figure 20:
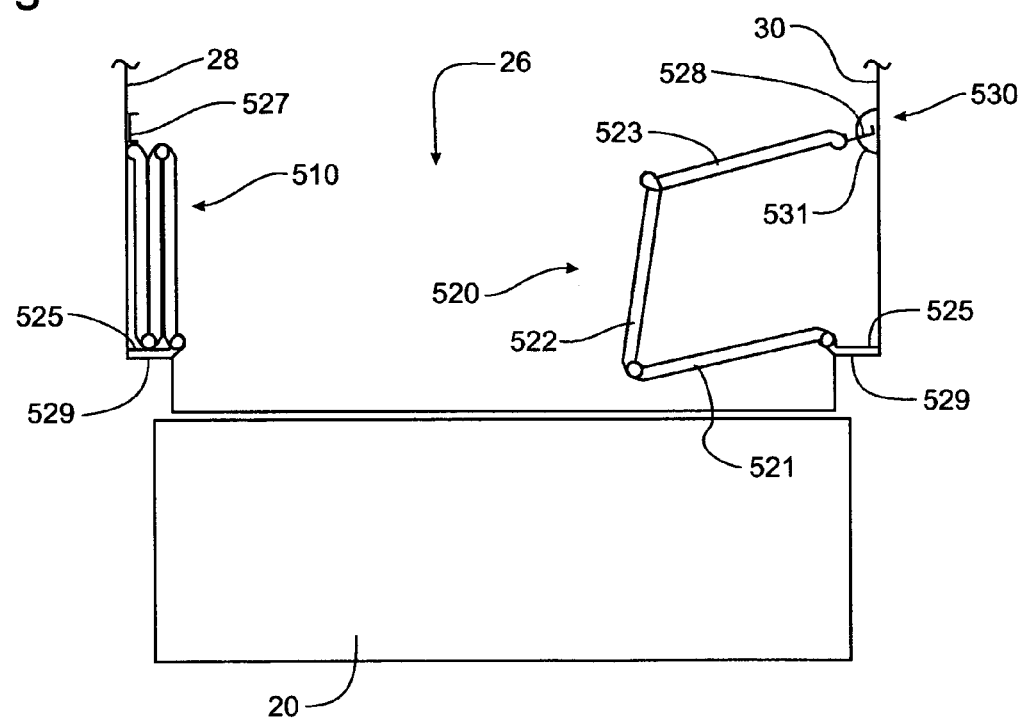
FIG. 20 is a schematic plan view of the rear portion of the vehicle with the tailgate lowered, the gate assemblies being of the embodiment depicted in FIG. 19 with the right side gate assembly being depicted in a storage container configuration.
Figure 21:
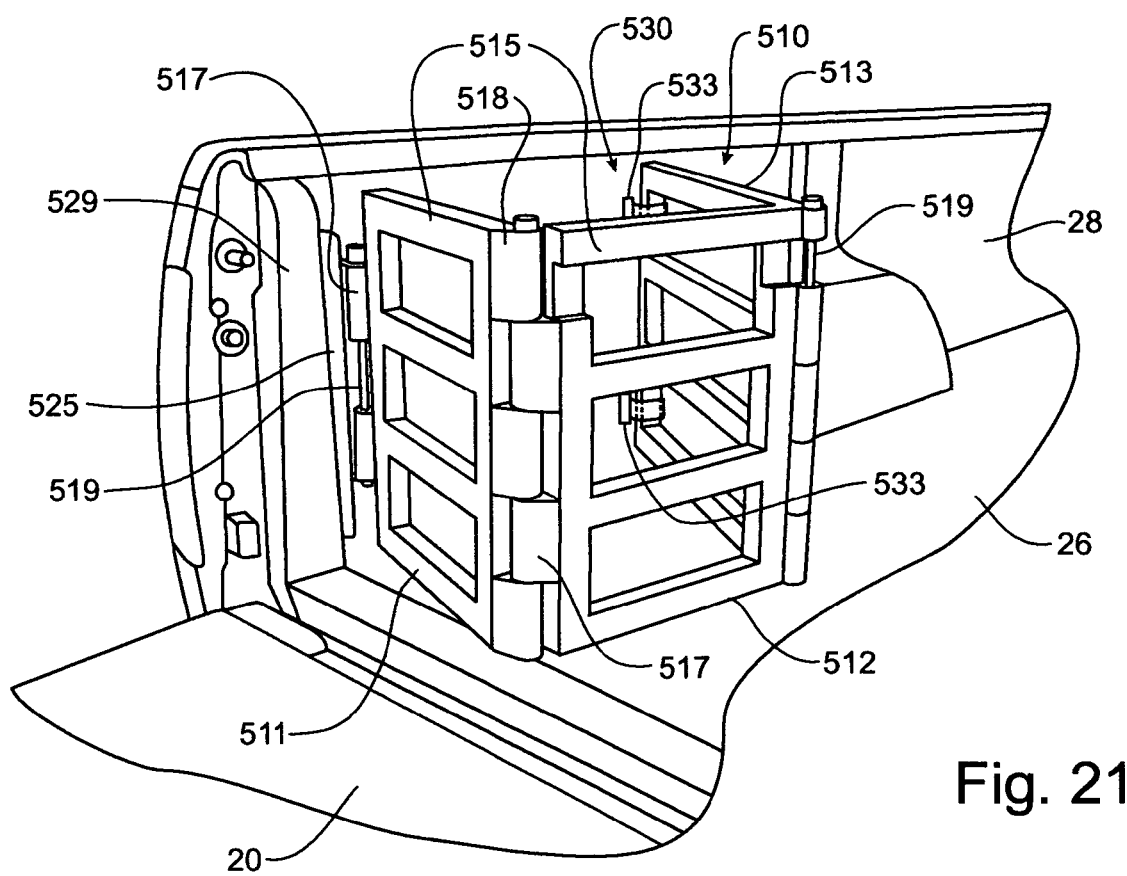
FIG. 21 is a partial rear perspective view of the left side gate assembly being depicted in the storage container configuration deployed at the rear of a pick-up truck.

FIGS. 19-21 depict an alternative embodiment of the gate assemblies 510, 520 formed by three pivotally connected panels 511-513 and 521-523 that can be collapsed into the storage position folded along side of the side walls 28, 30 of the cargo box 26 of the pick-up truck 24, as is depicted in phantom in FIG. 19 and in solid lines for the left gate assembly 510 in FIG. 20. As described above, the gate assemblies 510, 520 can be pivotally configured into a rearwardly oriented cargo retaining position, as depicted in FIG. 10, or in a more forwardly oriented cargo box dividing position, as depicted in FIG. 6, both of which extend transversely across the cargo box 26 with the left and right gate assemblies 510, 520 locking together in the deployed position.

As is depicted in FIGS. 20 and 21, the left or right gate assemblies 510, 520 can be pivotally oriented into a storage container configuration that defines and segregates a small area between the side wall 28, 30 of the cargo box 26 and the configured gate assembly 510, 520 into which small items, such as grocery bags can be stored without fear of losing the items from the cargo box 26 when the tailgate 20 is lowered, as is depicted in FIGS. 19-21. To reach this storage container configuration, the outer panel 511, 521 is pivoted toward the center of the cargo box 26. The middle panel 512, 522 is then pivoted to a position that extends generally forwardly of the outer panel 511, 521. Finally, the inner panel 513, 523 is pivotally positioned generally parallel to the outer panel 511, 521, but extending back outwardly toward the side wall 28, 30 of the cargo box 26.

A latching mechanism 530 is operable to fix the inner panel 513, 523 to the respective side wall 28, 30 to keep the panels 511-513 and 521-523 oriented in the storage container configuration. The latching mechanism 530 can be a simple strap 531, depicted in FIG. 20, or a pivoted and/or spring-loaded latching device 533 mounted on the side wall 28, 30 to positionally secure the inner panel 513, 523. One skilled in the art will recognize that many different varieties of latching mechanisms 530 can be created and utilized with the function of restraining the end of the inner panel 513, 523 against the side wall 28, 30.

Each of the individual panels 511-513 and 521-523 are formed in essentially identical shapes with a generally planar body portion 515 and oppositely bent mounting lobes 517, 518 that are pivotally pinned by a pivot rod 519 to allow the pivotal movement of one panel relative to the adjacent panel. In the case of the outer panel 511, 521, the first mounting lobe 517 is pivotally connected to a mounting bracket 525 that is affixed to the rear D-pillar 529 to provide a base for the gate assembly 510, 520. In the case of the middle panel 512, 522, the mounting lobe 517 is pivotally secured to the opposing mounting lobe 518 of the outer panel 511, 521, while the mounting lobe 518 is pivotally secured to the opposing mounting lobe 517 of the inner panel 513, 523. The endmost mounting lobe 518 of the inner panels 513, 523 are equipped with a connecting device 527, 528 that cooperates with the opposing connecting device 527, 528 to secure the gate assemblies 510, 520 in either of the transverse orientations across the cargo bed 26 as described above. As is best seen in FIG. 21, the body portions 515 of the individual panels 511-513 and 521-523 are preferably formed with openings therethrough to present a minimal amount of wind resistance when deployed transversely across the cargo bed 26, while providing structure that will retain cargo within the cargo bed 26.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a pick-up truck having a frame including a pair of opposing upright D-pillars, a cargo bed defined by opposing lateral upright side walls and a floor extending transversely between the side walls, and a tailgate pivotally supported between said side walls for movement between an upright closed position and a lowered open position, the improvement comprising:

a pivoting cage apparatus pivotally connected to one of said D-pillars and being positionable in a storage position against said side wall adjacent said one D-pillar, said cage structure being pivotally movable into a container storage position in which said pivoting cage apparatus extends inwardly from said one D-pillar toward the opposing D-pillar, then rearwardly and outwardly to said adjacent side wall to define an enclosed storage area bounded by said pivoting cage apparatus and said adjacent side wall.

2. The pick-up truck of claim 1 wherein a latching mechanism is associated with said adjacent side wall to engage said pivoting cage apparatus to selectively restrain said pivoting cage apparatus against said adjacent side wall.

3. The pick-up truck of claim 2 wherein said pivoting cage apparatus includes a first gate assembly having three pivotally connected individual panels, an outer panel pivotally connected to said one D-pillar including a middle panel pivotally connected to said outer panel, and an inner panel pivotally connected to said middle panel, said outer panel being engaged with said latching mechanism.

4. The pick-up truck of claim 3 wherein said pivoting cage apparatus includes a second gate assembly associated with said opposing D-pillar, said second gate assembly also having three pivotally connected individual panels including an outer panel pivotally connected to said opposing D-pillar, a middle panel pivotally connected to said outer panel, and an inner panel pivotally connected to said middle panel.

5. The pick-up truck of claim 4 wherein said first and second gate assemblies are operable to be deployed in a first deployed position extending transversely across said cargo bed, said gate assemblies further being oriented into a second deployed position extending transversely across said tailgate lowered into said open position.

6. The pick-up truck of claim 5 further comprising:
a supplemental tailgate assembly supported in said tailgate and including a support extendable from said tailgate and a cross member connected to said support and extending generally normal thereto, said supplemental tailgate assembly being pivotable relative to said tailgate into a vertically oriented position when said tailgate is in said open position to provide support for said pivoting cage apparatus when placed into said second deployed position.

7. The pick-up truck of claim 5 wherein said gate assemblies are pivotally connected to the corresponding said D-pillar through a mounting bracket affixed to the respective said D-pillar and pivotally connected to the corresponding said outer panel.

8. A pivoting cage cargo retainer for use in a vehicle having a cargo bed defined by opposing longitudinally extending side walls, first and second upright D-pillar frame members adjacent respective said side walls, and a tailgate pivotally mounted to said cargo bed between said D-pillars for movement between a raised closed position and a lowered open position, comprising:
a first gate assembly including an outer panel pivotally mounted on said first D-pillar for pivotal movement relative to said first D-pillar; a middle panel connected to said outer panel for pivotal movement relative thereto; and an inner panel connected to said middle panel for pivotal movement relative thereto, said first gate assembly being positionable into a storage configuration wherein said outer panel extends inwardly from said first D-pillar toward said second D-pillar, said middle panel extending rearwardly from said outer panel, and said inner panel extending outwardly to said adjacent side wall to define an enclosed storage area bounded by said first gate assembly and said adjacent side wall.

9. The pivoting cage cargo retainer of claim 8 further comprising:
a second gate assembly associated with said second D-pillar, said second gate assembly also having three pivotally connected individual panels including an outer panel pivotally connected to said second D-pillar, a middle panel pivotally connected to said outer panel, and an inner panel pivotally connected to said middle panel, said second gate assembly also being positionable in said storage configuration defining an enclosed storage area bounded by said second gate assembly and said adjacent side wall.

10. The pivoting cage cargo retainer of claim 9 wherein said first and second gate assemblies are operable to be deployed in a first deployed position extending transversely across said cargo bed, said gate assemblies further being oriented into a second deployed position extending transversely across said tailgate lowered into said open position.

11. The pivoting cage cargo retainer of claim 10 wherein said first and second gate assemblies are each pivotally connected to the corresponding said D-pillar through a mounting bracket affixed to the respective said D-pillar and pivotally connected to the corresponding said outer panel.

12. The pivoting cage cargo retainer of claim 11 wherein a latching mechanism is engagable with said inner panel to restrain selectively the position thereof adjacent said corresponding side wall and selectively fix the corresponding said gate assembly in the storage configuration.

13. The pivoting cage cargo retainer of claim 12 wherein said latching mechanism includes a latch member connected to each said side wall to engage the respective inner panel when placed adjacent thereto.

14. The pivoting cage cargo retainer of claim 13 further comprising:
a supplemental tailgate assembly supported in said tailgate and including a telescoping support extendable from said tailgate and a cross member connected to said telescoping support and extending generally normal thereto, said supplemental tailgate assembly being pivotable relative to said tailgate into a vertically oriented position when said tailgate is in said open position to provide support for said first and second gate assemblies when placed into said second deployed position.

15. A cargo retainer for use on a pick-up truck having a cargo bed on which is pivotally mounted a tailgate movable between a raised closed position and a lowered open position, said cargo bed having a pair of opposing side walls separated by a horizontal floor extending therebetween, said cargo bed including a first and second opposing upright D-pillars located at a rear portion of said cargo bed, comprising:
first and second gate assemblies formed from at least two upright panels hingedly connected together for movement between a storage position against at least one of said side walls and first and second deployed positions extending transversely between said D-pillars, said first deployed position extending transversely across said cargo bed, said second deployed position extending transversely across said tailgate lowered into said open position, each of said gate assemblies being further positionable into a side storage configuration enclosing a storage area bounded by the respective said gate assembly and the corresponding said side wall.

16. The cargo retainer of claim 15 wherein each said gate assembly is formed with an outer panel pivotally mounted on said the corresponding said D-pillar for pivotal movement relative to said D-pillar; a middle panel connected to said outer panel for pivotal movement relative thereto; and an inner panel connected to said middle panel for pivotal movement relative thereto, said side storage configuration being defined by said outer panel extending inwardly from the corresponding said D-pillar toward the opposing said D-pillar, said middle panel extending rearwardly from said outer panel, and said inner panel extending outwardly to said adjacent side wall.

17. The cargo retainer of claim 16 wherein said first and second gate assemblies are each pivotally connected to the corresponding said D-pillar through a mounting bracket affixed to the respective said D-pillar and pivotally connected to the corresponding said outer panel.

18. The cargo retainer of claim 17 wherein a latching mechanism is engagable with said inner panel to restrain selectively the position thereof adjacent said corresponding side wall and selectively fix the corresponding said gate assembly in the storage configuration.

19. The cargo retainer of claim 18 wherein said latching mechanism includes a latch member connected to each said side wall to engage the respective inner panel when placed adjacent thereto.

20. The cargo retainer of claim 16 further comprising:

a supplemental tailgate assembly supported in said tailgate and including a support extendable from said tailgate and a cross member connected to said support and extending generally normal thereto, said supplemental tailgate assembly being pivotable relative to said tailgate into a vertically oriented position when said tailgate is in said open position to provide support for said first and second gate assemblies when placed into said second deployed position.

* * * * *